(12) United States Patent　　(10) Patent No.: US 6,749,047 B2
Koyano et al.　　(45) Date of Patent: Jun. 15, 2004

(54) DUST COVER MOUNTING STRUCTURE OF HYDRAULIC SHOCK ABSORBER

(75) Inventors: Hidehiko Koyano, Saitama (JP); Takeshi Murata, Saitama (JP); Jiro Segawa, Saitama (JP); Shuichi Kato, Saitama (JP); Keiichi Sunami, Saitama (JP); Toshiya Hasegawa, Saitama (JP); Shigenori Inaba, Saitama (JP)

(73) Assignee: Showa Corporation Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 10/204,651

(22) PCT Filed: Dec. 20, 2000

(86) PCT No.: PCT/JP00/09053
§ 371 (c)(1),
(2), (4) Date: Sep. 18, 2002

(87) PCT Pub. No.: WO01/63139
PCT Pub. Date: Aug. 30, 2001

(65) Prior Publication Data
US 2003/0057041 A1　Mar. 27, 2003

(30) Foreign Application Priority Data
Feb. 22, 2000　(JP) ........................................ 2000-044945

(51) Int. Cl.[7] ................................................. F16F 9/00

(52) U.S. Cl. ............... 188/321.11; 267/220; 267/141.4; 280/155

(58) Field of Search ........................ 188/322.12, 321.11, 188/322.22; 267/220, 141.1–141.3, 141.4–141.7; 280/124.147, 124.155

(56) References Cited

U.S. PATENT DOCUMENTS

| | | | |
|---|---|---|---|
| 4,256,292 A | * | 3/1981 | Sullivan, Jr. et al. ....... 267/220 |
| 4,721,325 A | * | 1/1988 | Mackovjak et al. .. 280/124.155 |
| 5,664,650 A | | 9/1997 | Kammel et al. |
| 6,007,061 A | * | 12/1999 | Kammel et al. ............ 267/220 |

FOREIGN PATENT DOCUMENTS

| | | |
|---|---|---|
| JP | 57-127940 | 8/1982 |
| JP | 57-129942 | 8/1982 |
| JP | 7-63236 | 3/1995 |

* cited by examiner

*Primary Examiner*—Pam Rodriguez
(74) *Attorney, Agent, or Firm*—Orum & Roth

(57) ABSTRACT

In a dust cover mounting structure of a hydraulic shock absorber (10), a spring seat (15) is formed in a non-annular outer shape, a standing-up rib (34) is provided in an outer edge thereof, and a mounting portion (51) of a dust cover (50) is formed in a non-annular outer shape profiling an inner periphery of the rib (34) of the spring seat (15) and is received in the inner periphery of the rib (34).

18 Claims, 5 Drawing Sheets

(A)

(B)

(A)

(B)

(C)

(A)

(B)

(C)

DUST COVER MOUNTING STRUCTURE OF HYDRAULIC SHOCK ABSORBER

TECHNICAL FIELD

The present invention relates to a dust cover mounting structure of a hydraulic shock absorber.

BACKGROUND ART

Conventionally, there has been a hydraulic shock absorber, as described in Japanese Patent Application Laid-Open Publication (JP-A) No. 57-129942, such that a damper tube and a piston rod are provided, a spring seat is provided in the piston rod, a suspension spring is supported to the spring seat via a spring rubber, and a mounting portion of a dust cover is held between the spring seat and the spring rubber.

However, the prior art has the following problems.

(1) The spring seat is provided with a standing-up rib on an annular outer edge, and the mounting portion of the dust cover is rotatably received along an inner periphery of the annular rib. Accordingly, a torsion force generated at a time of extension and compression of the suspension spring rotates the dust cover to which the torsion force is applied via the spring rubber while rubbing the dust cover against the spring seat, whereby dusts are generated on the basis of abrasion of the dust cover so as to pollute an environment. This dust generation is significant when the dust cover is made of a resin.

(2) Since the mounting portion between the spring rubber and the dust cover is simply laminated on the spring seat, it is quite possible that the spring rubber and the dust cover are dropped off in a step of attaching an assembly obtained by laminating the spring rubber and the dust cover on the spring seat to the piston rod so as to bring into contact and align with the spring seat, so that an assembling property is deteriorated.

(3) An outer periphery of the spring rubber is restricted neither by the spring seat nor the dust cover. Accordingly, when the spring rubber repeatedly receives a compression force on the basis of a spring force of the suspension spring, the spring rubber freely protrudes in a direction of the outer periphery so as to be yielded and deformed, so that there is a risk that the spring rubber is broken or dropped off.

DISCLOSURE OF THE INVENTION

An object of the present invention is to prevent dusts from being generated due to rotation of a dust cover at a time of holding a mounting portion of the dust cover between a spring rubber and a spring seat which receive a suspension spring.

Further, another object of the present invention is to improve an assembling property of a spring seat, a dust cover and a spring rubber and to prevent the spring rubber from being yielded and deformed.

In accordance with the present invention, there is provided a dust cover mounting structure of a hydraulic shock absorber comprising:

a damper tube;

a piston rod;

a spring seat provided in the piston rod;

a suspension spring supported to the spring seat via a spring rubber; and a mounting portion of a dust cover held between the spring seat and the spring rubber, wherein the spring seat is formed in a non-annular outer shape, a standing-up rib is provided in an outer edge thereof, and the mounting portion of the dust cover is formed in a non-annular outer shape profiling an inner periphery of the rib of the spring seat and is received in the inner periphery of the rib.

DETAILED DESCRIPTION OF THE PREFERRED EMBODIMENT

Figure 1:
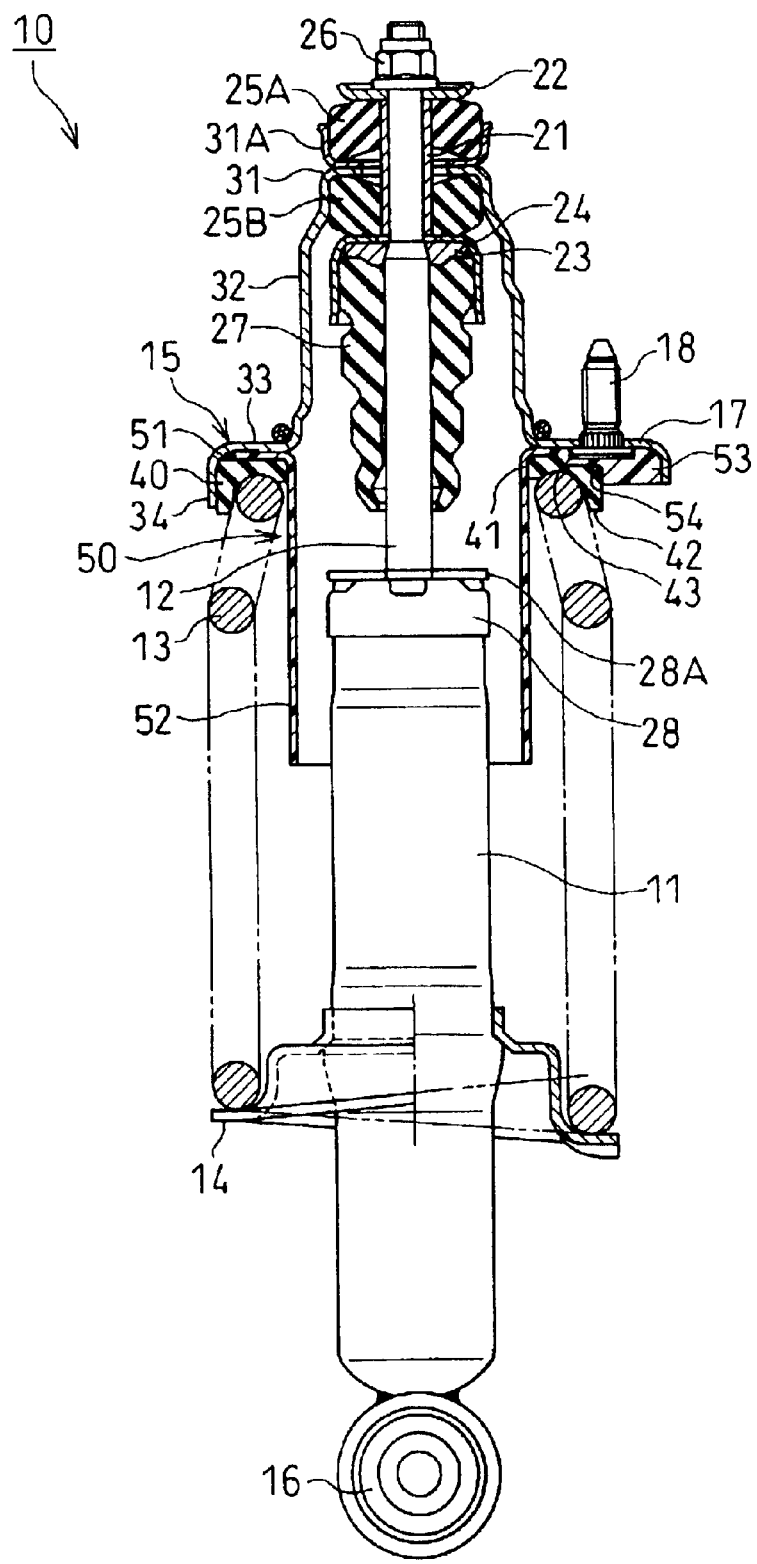
FIG. 1 is a cross sectional view showing a hydraulic pressure shock absorber.
Figure 2:
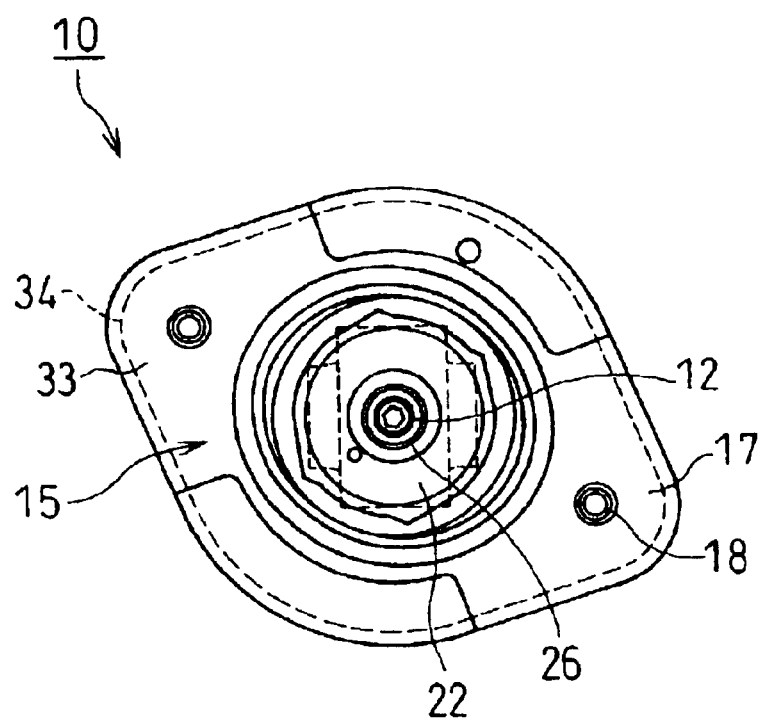
FIG. 2 is a plan view of FIG. 1.

A hydraulic shock absorber 10 has, as shown in FIGS. 1 and 2, a damper tube 11, a piston rod 12 and a suspension spring 13, and is structured such that a lower spring seat 14 is attached to an outer peripheral portion of the damper tube 11. An upper spring seat 15 is attached to the piston rod 12 and the suspension spring 13 is interposed between the spring seats 14 and 15.

The hydraulic shock absorber 10 is provided with an axle side mounting portion 16 in a lower portion of the damper tube 11, is provided with a vehicle body side mounting portion 17 in the upper spring seat 15 attached to the piston rod 12, and a mounting bolt 18 attaches to the vehicle body side mounting portion 17. The hydraulic shock absorber 10 absorbs an impact applied from a road surface by the suspension spring 13 and damps an expanding and compressing vibration of the suspension spring 13 by a damping device (not shown) installed within the damper tube 11.

In this case, the hydraulic shock absorber 10 positions receiving seats 22 and 23 and a cover 24 by a joint collar 21 inserted and attached to an outer end portion of the piston rod 12. Mount rubbers 25A and 25B are provided between the receiving seats 22 and 23, and a mounting nut 26 is engaged with an upper end portion of the piston rod 12 in a state of holding a base end portion 31 of the upper spring seat 15 between the mount rubbers 25A and 25B. Further, a bump rubber 27 is pressure inserted around the piston rod 12 surrounded by the cover 24. A bump stopper cap 28 is fixed around an axial seal portion through which the piston rod 12 of the damper tube 11 extends, and a bump rubber contact plate 28A is provided in the bump stopper cap 28.

In this case, in the hydraulic shock absorber 10, the circular suspension spring 13 is supported to the upper spring seat 15 via a spring rubber 40, and a mounting portion 51 of a dust cover 50 is held between the upper spring seat 15 and the spring rubber 40. A description will be in detail given below of a mounting structure of the dust cover 50.

Figure 3:
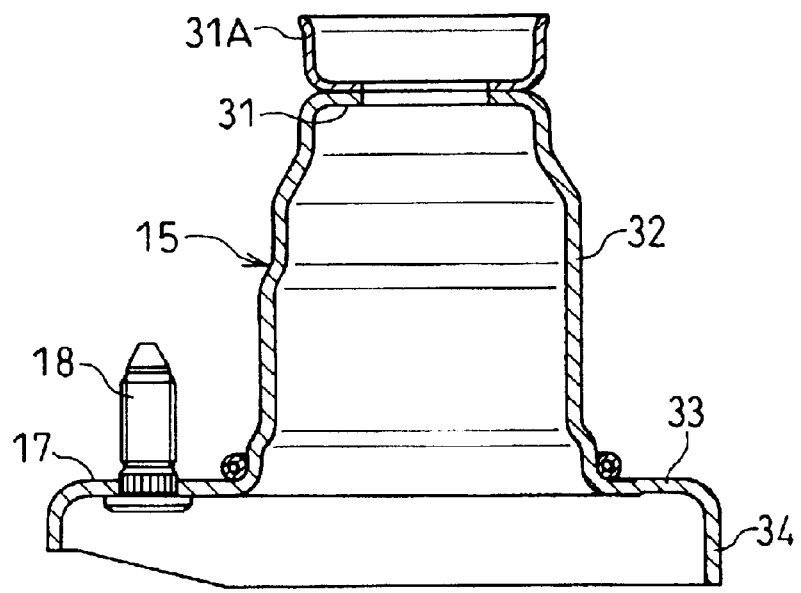
FIG. 3 is a schematic view showing a spring seat.
Figure 3:
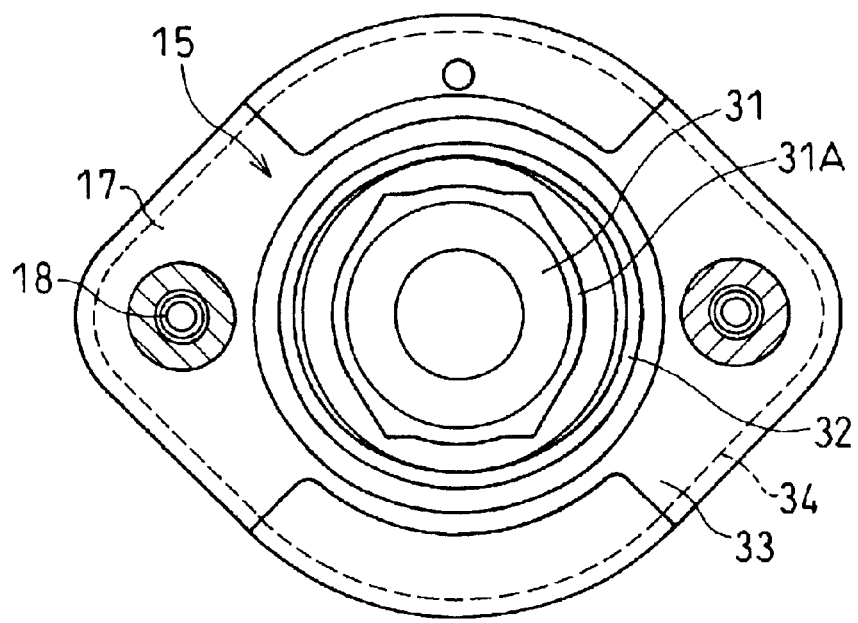

The spring seat 15 is, as shown in FIG. 3, made of a metal, has the base end portion 31 mentioned above (provided with a cup 31A surrounding the mount rubber 25A), and is provided with a cylindrical portion 32 extending from an outer peripheral side of the base end portion 31 and a spring receiving portion 33 provided at an extending end of the cylindrical portion 32. The spring receiving portion 33 of the spring seat 15 forms the vehicle body side mounting portion 17 mentioned above at a back surface thereof. It is provided with the mounting bolt 18, is formed in a non-annular shape such as a diamond shape and an oval shape, and is provided with the standing-up rib 34 on an outer edge of a front surface thereof.

Figure 4:
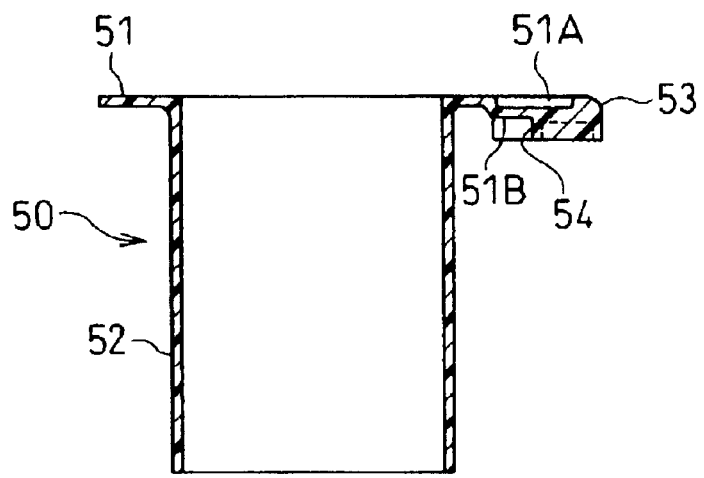
FIG. 4 is a schematic view showing a dust cover.
Figure 4:
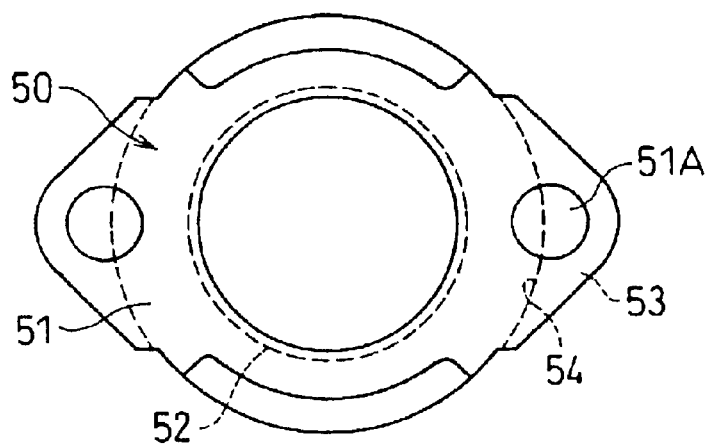
Figure 4:
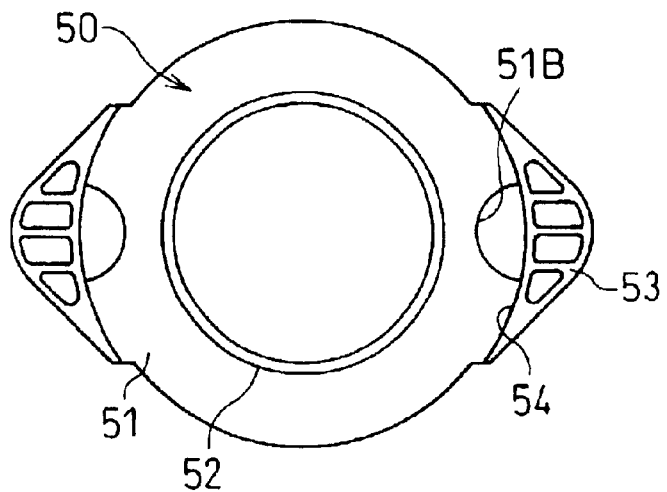

The dust cover 50 is, as shown in FIG. 4, made of a resin such as PE (polyethylene), TPE (thermoplastic elastomer (santplane)) or the like, has the mounting portion 51 mentioned above and is provided with a cylindrical portion 52 extending from an inner peripheral side of the mounting portion 51. The mounting portion 51 of the dust cover 50 has a non-annular outer shape profiling the inner periphery of the rib 34 of the spring seat 15, and the outer shape is received in the inner periphery of the rib 34.

The mounting portion 51 of the dust cover 50 is further provided with a thick protruding portion 53 at two positions in both sides in a direction of a long diameter of the outer shape of the spring seat 15, and is provided with a circular arc step-shaped groove 54 receiving a part of the outer periphery of the spring rubber 40 in the protruding portion 53. In this case, the mounting portion 51 is provided with a circular recess portion 51A for receiving a head portion of the mounting bolt 18 attached to the spring receiving portion 33 of the spring seat 15 in a range extending around the protruding portion 53 in the back surface side brought into contact with the spring seat 15, and is provided with a circular convex portion 51B protruding to an opposite side to the recess portion 51A in correspondence to an existence of the recess portion 51A, in a front surface side thereof.

Figure 5:
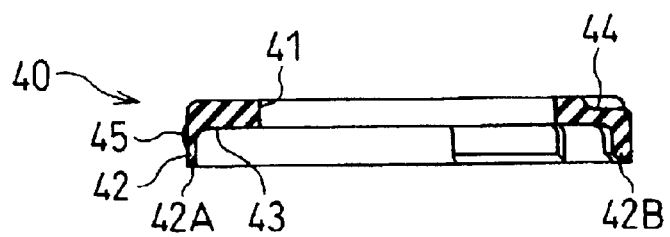
FIG. 5 is a schematic view showing a spring rubber.
Figure 5:
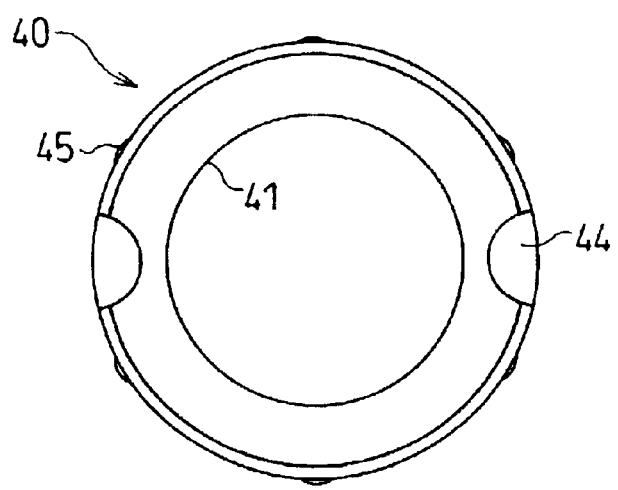
Figure 5:
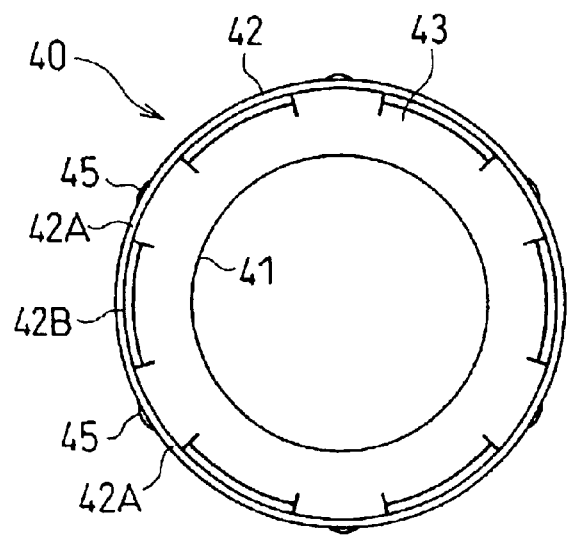

The spring rubber 40 is, as shown in FIG. 5, made of a rubber (NR), and is structured such that a flat annular inner periphery is formed as a hole portion 41 attached to the cylindrical portion 52 of the dust cover 50. An outer periphery is formed as a standing-up portion 42 standing up in a front surface side, and a circular spring seat surface 43 is formed in an inner peripheral side of the standing-up portion 42. The spring rubber 40 is provided with a circular recess portion 44 corresponding to the circular convex portion 51B of the mounting portion 51 at two positions in a diametrical direction of the back surface brought into contact with the mounting portion 51 of the dust cover 50.

The spring rubber 40 is provided with a projection 45 at a plurality of positions (for example, six positions) in a peripheral direction on an outer periphery of the standing-up portion 42. It is pressure inserted to the inner periphery of the rib 34 of the spring seat 15 via the projection 45 in a direction of a short diameter of the outer shape of the spring seat 15, and is received (or pressure inserted) to the groove 54 of the protruding portion 53 of the dust cover 50 via the projection 45 in a direction of a long diameter of the outer shape of the spring seat 15. In this case, the standing-up portion 42 of the spring rubber 40 is constituted by a thin standing-up portion 42A in which the projection 45 is provided, and a thick standing-up portion 42B disposed between the adjacent thin standing-up portions 42A and 42A.

Accordingly, the hydraulic shock absorber 10 is assembled in a manner mentioned below.

(1) The lower end portion of the suspension spring 13 is seated to the lower spring seat 14 attached to the outer peripheral portion of the damper tube 11.

(2) The mounting portion 51 of the dust cover 50 is assembled in the spring receiving portion 33 of the upper spring seat 15 and the spring rubber 40 holding the mounting portion 51 is pressure inserted to the inner periphery of the rib 34 of the spring receiving portion 33 of the upper spring seat 15, thereby obtaining the assembled body.

(3) The assembled body in the item (2) mentioned above is inserted to the damper tube 11 and the piston rod 12, and the spring rubber 40 which the spring receiving portion 33 of the upper spring seat 15 backs up via the dust cover 50 is brought into contact and aligned with the upper end portion of the suspension spring 13. Thereafter, the mounting nut 26 is engaged with the upper end portion of the piston rod 12, whereby an assembly is completed.

Therefore, in accordance with the present embodiment, the following effects can be obtained.

(1) The spring seat 15 is provided with the standing-up rib 34 on the non-annular outer edge, and the mounting portion 51 of the dust cover 50 is received so as to profile the inner periphery of the non-annular rib 34, thereby preventing the dust cover 50 from rotating. Accordingly, even when a torsion force generated at a time of extension and compression of the suspension spring 13 is applied to the dust cover 50 via the spring rubber 40, the dust cover 50 does not rotate at all, so that dust is not generated on the basis of the friction between the dust cover 50 and the spring seat 15.

(2) The spring rubber 40 is pressure inserted to the inner periphery of the rib 34 of the spring seat 15 via the projection 45 on the outer periphery thereof in a state of holding the mounting portion 51 of the dust cover 50 therebetween, thereby constituting the assembled body. Accordingly, the spring rubber 40 and the dust cover 50 do not drop off from the spring seat 15 in an assembling step of attaching the assembled body to the piston rod 12 so as to bring into contact and align with the suspension spring 13, so that an assembling property can be improved.

(3) The spring rubber 40 is structured such that the outer periphery in the direction of the short diameter of the spring seat 15 is pressure inserted to the inner periphery of the rib 34 of the spring seat 15 so as to be restricted, and the outer periphery in the direction of the long diameter of the spring seat 15 is received (may be pressure inserted) to the groove 54 of the protruding portion 53 in the dust cover 50 so as to be restricted. Accordingly, even when the spring rubber 40 repeatedly receives a compression force on the basis of a spring force of the suspension spring 13, the spring rubber 40 does not freely protrude in a direction of the outer periphery so as to be prevented from being yielded and deformed. p1 (4) The dust cover 50 is formed by a resin, whereby it is possible to secure a strength sufficient to restrict the deformation of the spring rubber 40 in the dust cover 50.

In this case, in the embodiment in accordance with the present invention, the structure may be made such that the outer shape of the spring rubber is also formed in a non-annular shape profiling the inner periphery of the rib of the spring seat, and the spring rubber is pressure inserted to all the area of the inner periphery of the rib of the spring seat with holding the non-annular mounting portion of the dust cover between the spring rubber and the spring seat.

Further, the dust cover may be provided with a groove formed in series in a peripheral direction so as to receive all the periphery of the spring rubber. At this time, the spring rubber may be structured such that a part in a height direction is received in the groove of the dust cover and another part in the height direction is pressure inserted to the inner periphery of the rubber of the spring seat in an external portion of the groove of the dust cover.

As mentioned above, the embodiment in accordance with the present invention is described in detail, however, the particular structure of the present invention is not limited to the embodiment and a design modification within the scope of the present invention will be contained in the present invention. For example, the rib provided in the outer edge of the spring seat is not always required to extend the entire periphery of the spring seat. Further, the cylindrical portion of the dust cover is not limited to the structure extending from the inner peripheral side of the mounting portion, and may extend from the outer peripheral side so as to surround the outer periphery of the suspension spring.

INDUSTRIAL APPLICABILITY

In accordance with the invention stated in the first aspect, the following effect (1) can be obtained.

(1) The spring seat is provided with the standing-up rib on the non-annular outer edge, and the mounting portion of the dust cover is received so as to profile the inner periphery of the non-annular rib, thereby preventing the dust cover from rotating. Accordingly, even when a torsion force generated during extension and compression of the suspension spring is applied to the dust cover via the spring rubber, the dust cover does not rotate at all, so that the dust is not generated on the basis of the friction between the dust cover and the spring seat.

In accordance with the invention stated in the second aspect, the following effects (2) and (3) can be obtained.

(2) The spring rubber is pressure inserted to the inner periphery of the rib of the spring seat in a state of holding the mounting portion of the dust cover therebetween, thereby constituting the assembled body. Accordingly, the spring rubber and the dust cover do not drop off from the spring seat in an assembling step of attaching the assembled body to the piston rod so as to bring into contact and align with the suspension spring, so that an assembling property can be improved.

(3) The outer periphery of the spring rubber is restricted by the rib of the spring seat. Accordingly, even when the spring rubber repeatedly receives a compression force on the basis of a spring force of the suspension spring, the spring rubber does not freely protrude in a direction of the outer periphery so as to be prevented from being yielded and deformed.

In accordance with the invention stated in the third aspect, the following effect (4) can be obtained.

(4) The spring rubber is received in the groove of the dust cover and the outer periphery thereof is restricted by the groove of the dust cover. Accordingly, even when the spring rubber repeatedly receives a compression force on the basis of a spring force of the suspension spring, the spring rubber does not freely protrude in a direction of the outer periphery so as to be prevented from being yielded and deformed.

In accordance with the invention stated in the fourth aspect, the following effects (5) and (6) can be obtained.

(5) The spring rubber is pressure inserted to the inner periphery of the rib of the spring seat via the projection on the outer periphery thereof in a state of holding the mounting portion of the dust cover therebetween, thereby constituting the assembled body. Accordingly, the spring rubber and the dust cover do not drop off from the spring seat in an assembling step of attaching the assembled body to the piston rod so as to bring into contact and align with the suspension spring, so that an assembling property can be improved.

(6) The spring rubber is structured such that the outer periphery in the direction of the short diameter of the spring seat is pressure inserted to the inner periphery of the rib of the spring seat so as to be restricted and the outer periphery in the direction of the long diameter of the spring seat is received (may be pressure inserted) to the groove of the protruding portion in the dust cover so as to be restricted. Accordingly, even when the spring rubber repeatedly receives a compression force on the basis of a spring force of the suspension spring, the spring rubber does not freely protrude in a direction of the outer periphery so as to be prevented from being yielded and deformed.

In accordance with the invention stated in the fifth aspect, the following effect (7) can be obtained.

(7) The dust cover is formed by a resin, whereby it is possible to secure a strength sufficient to restrict the deformation of the spring rubber in the dust cover.

In accordance with the invention stated in the sixth aspect, the following effect (8) can be obtained.

(8) The circular convex portions are provided at two positions in the diametrical direction of the surface brought into contact with the spring rubber in the mounting portion of the dust cover. The circular convex portions are engaged with the circular recess portions provided at two positions in the diametrical direction of the surface brought into contact with the mounting portion of the dust cover in the spring rubber in the peripheral direction. Accordingly, even when the torsion force generated at a time of extension and compression of the suspension spring is applied to the spring rubber, it is possible to prevent the spring rubber from rotating in the peripheral direction with respect to the dust cover due to the engagement between the circular convex portion of the dust cover and the circular recess portion of the spring rubber. Therefore, it is possible to prevent the abrasion between the dust cover and the spring rubber.

In accordance with the invention stated in the seventh aspect, the following effect (9) can be obtained.

(9) The standing-up portion of the spring rubber is constituted by the thin standing-up portion in which the projection is provided on the outer periphery, and the thick standing-up portion provided between the adjacent thin standing-up portions. Accordingly, when the spring rubber is pressure inserted to the inner periphery of the rib of the spring seat via the projection on the outer periphery thereof or received in the groove of the protruding portion of the dust cover in a state that the spring rubber holds the mounting portion of the dust cover therebetween, the standing-up portion in which the projection is provided is easily elastically deformed in the radial direction of the spring rubber since the standing-up portion in which the projection is provided is thin, so that the pressure inserting (or receiving) work of the spring seat can be made easy. In addition, after the spring seat is pressure inserted (or received), the projection provided in the thin standing-up portion is continuously pressure inserted (or received) by the elastic recovery force to the inner periphery of the rib in the spring seat or in the groove of the protruding portion in the dust cover, so that it is possible to stably form the sub-assembled body obtained by easily attaching the spring rubber and the dust cover to the spring seat.

In accordance with the invention stated in the eighth aspect, the following effect (10) can be obtained.

(10) In addition to the mounting portion of the dust cover, the outer shape of the spring rubber is also formed in the non-annular shape profiling the inner periphery of the rib in the spring seat, thereby preventing the rotation of the dust cover and the spring rubber. Accordingly, even when the torsion force generated at a time of extension and compression of the suspension spring is applied to dust cover via the spring rubber, both of the dust cover and the spring seat do not rotate at all and dust is not generated on the basis of the friction with respect to the spring seat.

As mentioned above, in accordance with the present invention, it is possible to prevent dust from being generated due to the rotation of the dust cover during holding the mounting portion of the dust cover between the spring rubber for receiving the suspension spring and the spring seat.

Further, in accordance with the present invention, it is possible to improve an assembling property of the spring seat, the dust cover and the spring rubber, and it is possible to prevent the spring rubber from being yielded and deformed.

What is claimed is:

1. A dust cover mounting structure of a hydraulic shock absorber comprising:
    a damper tube;
    a piston rod;
    a spring seat provided in the piston rod;
    a suspension spring supported to the spring seat via a spring rubber; and
    a mounting portion of a dust cover held between the spring seat and the spring rubber,
    wherein the spring seat is formed in a non-annular outer shape, a standing-up rib is provided in an outer edge thereof, and the mounting portion of the dust cover is formed in a non-annular outer shape profiling an inner periphery of the rib of the spring seat to prevent rotation of the dust cover and is received in the inner periphery of said rib.

2. A dust cover mounting structure of a hydraulic shock absorber as claimed in claim 1, wherein said spring rubber is pressure inserted to the inner periphery of the rib in the spring seat.

3. A dust cover mounting structure of a hydraulic shock absorber as claimed in claim 2, wherein said spring rubber is made of a rubber and said dust cover is made of a resin.

4. A dust cover mounting structure of a hydraulic shock absorber as claimed in claim 2, wherein said dust cover is provided with a groove for receiving the spring rubber.

5. A dust cover mounting structure of a hydraulic shock absorber as claimed in claim 1, wherein said dust cover is provided with a groove for receiving the spring rubber.

6. A dust cover mounting structure of a hydraulic shock absorber as claimed in claim 1, wherein said dust cover is provided with a thick protruding portion in a direction of a long diameter of the outer shape of the spring seat, a groove for receiving the spring rubber is provided in the protruding portion, the spring rubber is provided with projections at a plurality of positions in a peripheral direction of the outer periphery, and the spring rubber is pressure inserted to the inner periphery of the rib in the spring seat via said projections in a direction of a short diameter of the outer shape of the spring seat and is received in the groove of the protruding portion in the dust cover via said projections in a direction of a long diameter of the outer shape of the spring seat.

7. A dust cover mounting structure of a hydraulic shock absorber as claimed in claim 6, wherein said spring rubber is provided with a standing-up portion forming a spring seated surface in an inner peripheral side, and the standing-up portion is constituted by thin standing-up portions each provided with at least one of said projections and a thick standing-up portions disposed between the adjacent thin standing-up portions.

8. A dust cover mounting structure of a hydraulic shock absorber as claimed in claim 1, wherein said spring rubber is made of a rubber and said dust cover is made of a resin.

9. A dust cover mounting structure of a hydraulic shock absorber as claimed in claim 1, wherein circular convex portions are provided at two positions in a diametrical direction of a surface brought into contact with said spring rubber in the mounting portion of said dust cover, and circular recess portions are provided at two positions in a diametrical direction of a surface brought into contact with the mounting portion of said dust cover in said spring rubber, said circular recess portions being engaged with the circular convex portions provided in the mounting portion of said dust cover in the peripheral direction.

10. A dust cover mounting structure of a hydraulic shock absorber as claimed in claim 1, wherein an outer shape of said spring rubber is formed in a non-annular shape profiling the inner periphery of the rib in said spring seat, and said spring rubber holds the non-annular mounting portion of said dust cover between said spring rubber and said spring seat and is pressure inserted to all the area of the inner periphery of the rib in said spring seat.

11. A dust cover mounting structure of a hydraulic shock absorber comprising:
    a damper tube;
    a piston rod;
    a spring seat provided in the piston rod;
    a suspension spring supported to the spring seat via a spring rubber; and
    a mounting portion of a dust cover held between the spring seat and the spring rubber,
    wherein the spring seat is formed in a non-annular outer shape, a standing-up rib is provided in an outer edge thereof, the mounting portion of the dust cover is formed in a non-annular outer shape profiling an inner periphery of the rib of the spring seat and is received in the inner periphery of said rib, and
    said spring rubber is pressure inserted to the inner periphery of the rib in the spring seat.

12. A dust cover mounting structure of a hydraulic shock absorber as claimed in claim 11, wherein said spring rubber is made of a rubber and said dust cover is made of a resin.

13. A dust cover mounting structure of a hydraulic shock absorber as claimed in claim 11, wherein said dust cover is provided with a groove for receiving the spring rubber.

14. A dust cover mounting structure of a hydraulic shock absorber comprising:
    a damper tube;
    a piston rod;
    a spring seat provided in the piston rod;
    a suspension spring supported to the spring seat via a spring rubber; and
    a mounting portion of a dust cover held between the spring seat and the spring rubber,
    wherein the spring seat is formed in a non-annular outer shape, a standing-up rib is provided in an outer edge thereof, the mounting portion of the dust cover is formed in a non-annular outer shape profiling an inner periphery of the rib of the spring seat and is received in the inner periphery of said rib, and said dust cover is provided with a groove for receiving the spring rubber.

15. A dust cover mounting structure of a hydraulic shock absorber comprising:

a damper tube;

a piston rod;

a spring seat provided in the piston rod;

a suspension spring supported to the spring seat via a spring rubber; and a mounting portion of a dust cover held between the spring seat and the spring rubber, wherein the spring seat is formed in a non-annular outer shape, a standing-up rib is provided in an outer edge thereof, the mounting portion of the dust cover is formed in a non-annular outer shape profiling an inner periphery of the rib of the spring seat and is received in the inner periphery of said rib, said dust cover is provided with a thick protruding portion in a direction of a long diameter of the outer shape of the spring seat, a groove for receiving the spring rubber is provided in the protruding portion, the spring rubber is provided with projections at a plurality of positions in a peripheral direction of the outer periphery, and the spring rubber is pressure inserted to the inner periphery of the rib in the spring seat via said projections in a direction of a short diameter of the outer shape of the spring seat and is received in the groove of the protruding portion in the dust cover via said projections in a direction of a long diameter of the outer shape of the spring seat.

16. A dust cover mounting structure of a hydraulic shock absorber as claimed in claim 15, wherein said spring rubber is provided with a standing-up portion forming a spring seated surface in an inner peripheral side, and the standing-up portion is constituted by a thin standing-up portions each provided with at least one of said projections and thick standing-up portions disposed between the adjacent thin standing-up portions.

17. A dust cover mounting structure of a hydraulic shock absorber comprising:

a damper tube;

a piston rod;

a spring seat provided in the piston rod;

a suspension spring supported to the spring seat via a spring rubber; and a mounting portion of a dust cover held between the spring seat and the spring rubber, wherein the spring seat is formed in a non-annular outer shape, a standing-up rib is provided in an outer edge thereof, the mounting portion of the dust cover is formed in a non-annular outer shape profiling an inner periphery of the rib of the spring seat and is received in the inner periphery of said rib, circular convex portions are provided at two positions in a diametrical direction of a surface brought into contact with said spring rubber in the mounting portion of said dust cover, and circular recess portions are provided at two positions in a diametrical direction of a surface brought into contact with the mounting portion of said dust cover in said spring rubber, said circular recess portions being engaged with the circular convex portions provided in the mounting portion of said dust cover in the peripheral direction.

18. A dust cover mounting structure of a hydraulic shock absorber comprising:

a damper tube;

a piston rod;

a spring seat provided in the piston rod;

a suspension spring supported to the spring seat via a spring rubber; and a mounting portion of a dust cover held between the spring seat and the spring rubber, wherein the spring seat is formed in a non-annular outer shape, a standing-up rib is provided in an outer edge thereof, the mounting portion of the dust cover is formed in a non-annular outer shape profiling an inner periphery of the rib of the spring seat and is received in the inner periphery of said rib, an outer shape of said spring rubber is formed in a non-annular shape profiling the inner periphery of the rib in said spring seat, and said spring rubber holds the non-annular mounting portion of said dust cover between said spring rubber and said spring seat and is pressure inserted to all the area of the inner periphery of the rib in said spring seat.

* * * * *